F. Martin,
Well Packing,
N°. 49,903.  Patented Sep. 12, 1865.

Witnesses:  Inventor

UNITED STATES PATENT OFFICE.

FRANCIS MARTIN, OF NEW YORK, N. Y.

IMPROVEMENT IN DEEP-WELL PACKING.

Specification forming part of Letters Patent No. 49,903, dated September 12, 1865.

*To all whom it may concern:*

Be it known that I, FRANCIS MARTIN, of the city, county, and State of New York, have invented a new and useful Improvement in Packing for Tubes of Oil and other Wells; and I do hereby declare that the following is a full, clear, and exact description thereof, which will enable others skilled in the art to fully understand and use the same, reference being had to the accompanying drawings, forming part of this specification, in which—

Figure 1:
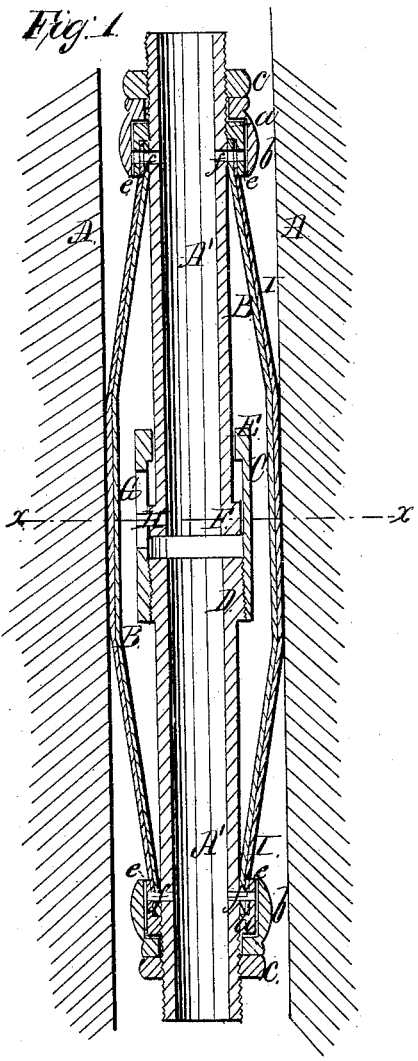
Figure 2:
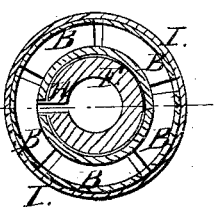

Figure 1 is an axial section of an apparatus made according to my invention, with a section of those portions of the well-tube to which it is applied, $y$, Fig. 2, being the line of section. Fig. 2 is a transverse section on the line $x$ of Fig. 1.

Similar letters of reference indicate like parts.

This invention relates to packing the tubes of oil and other deep wells which are to be protected from the inflowing of surface-water and of water from springs and other sources.

It consists in applying a series of flat springs, arranged lengthwise in the form of a cylinder, about a well-tube, the latter being divided or made in two sections within the points inclosed by the springs, and their ends connected by a coupling in such a way as to make a sliding joint. The ends of the springs are fixed to the different sections of the pipe, and the several springs are inclosed by a cylinder of gutta-percha or other suitable elastic material.

A' A' designate parts of adjacent sections of a well-tube in place within a well, whose sides are indicated by the red lines A. Their ends are coupled by a coupling-tube, C, one end of which is fixed by a screw-joint, D, or by any other suitable device, about the end of one of the sections A'. In this example it is connected about the lower section. The upper end of the coupling-tube is enlarged on the inside so as form an inner circumferential rim or shoulder, E, which slides easily along the outside of the upper section A', but is prevented from coming off the same by a rim, F, surrounding the lower end of said upper section. A slot, G, is cut in the coupling-tube C parallel with its axis, in which slot a pin, H, projecting from the rim F, is fitted, for the purpose of guiding the upper section of the well-tube when it slides along inside the coupling-tube, and so preventing it from having any rotary motion. If any rotary motion of the said section were to take place, its effect would be to twist and injure the elastic leaves B which inclose the sliding joint.

The letters B designate metallic leaves or spring-plates arranged about the well-tube in the form of a cylinder, so as to inclose the joint of the well-tube and the coupling-pipe aforesaid. Their ends are secured to the said sections A' A' of the well-tube by means of nuts $a\ a$, which have flanges $e\ e$ projecting in the direction of the sliding joint. The said nuts $a$ are screwed upon the sections A' of the well-tubes, respectively, and their positions thereon are to be such as that their flanges $e$ will inclose the ends of the elastic leaves B, which leaves are of such a width at their ends as that when they are placed beneath the flanges $e$, side by side, they form a cylinder. The several leaves, moreover, may be soldered together at their ends along adjacent edges, so as to form at those parts a complete or unbroken cylindrical body; or the said leaves may be formed by cutting a series of longitudinal slits in a cylinder, said slits reaching nearly from one end to the other of such cylinder, thereby forming a series of leaves B. These leaves, whether made from separate strips of metal or by making slits in a cylinder, may be bent outward, as shown in Fig. 1, so that the central parts thereof shall always be clear of the coupling. The nuts $a$ and leaves are secured to the several sections A' of the well-tube and to each other by pins or screws $f$, and the nuts are inclosed by glands $b$, which are held in place by jam-nuts C.

I is a cylindrical covering of elastic material—such, for instance, as gutta-percha or other suitable material which will not be corroded by the action of petroleum or other substance with which it is liable to come in contact—placed about the leaves B so as entirely to cover them, the ends of said covering being confined beneath the flange $e$ of the nuts $a$, as described, of the ends of the leaves.

The operation of the apparatus is as follows: The sections A' of the well-tube to which the packing device is attached are located at that part of the tube where the packing is to be used for shutting off surface and other water from the bottom of the well. When the well-tube is in place, its lowest section resting on the bottom of the well, that part of the tube which is about the sections A' will, by their weight, force the upper one of said sections toward the lower one, thereby causing the central parts of said leaves B to bulge outward toward the sides of the well and against the same, so as to make a tight joint with said sides, and thus prevent the passage of water downward from above the packing or of gas or liquid from below upward. If the weight of the superincumbent tubing is not sufficient to expand the metallic springs B sufficiently to pack the tube, a lever or weight may be applied thereto at the surface of the earth, so as to bring the sections A' nearer together, and thus enlarge the diameter of the packing device. When the well-tube is to be drawn out of the well it is evident that the packing device will not obstruct its ascent, because so soon as the pressure of the superincumbent tubing is taken off the upper section A' the elasticity of the spring-leaves will cause them to resume their normal position and thus become reduced in diameter, when they can be drawn upward without touching the sides of the well.

The great advantage of this packing is that it is sure to make a perfect water-tight joint. When the tube is put in the well its weight pulls upon the lower section A' and expands the slip-joint, and thus contracts the diameter of the series of springs B and brings them close to the body of the tube, and thereby secures the packing, and especially the outer covering, I, which is to be air and water tight, from injury. When the tube rests on the bottom of the well the weight of that part which is above the packing contracts the slip-joint and expands the packing. The outside of the cylinder I, at the middle of its length, may be covered with sheep-skin, with the wool outside, for the purpose of filling the pores of the rock and any crevices which may exist at the point where the packing is applied.

I claim as new and desire to secure by Letters Patent—

1. In packing the tubes of oil and other deep wells, connecting the ends of the packing device or apparatus to separate or disconnected sections of the well-tube, so as to inclose the joint within said packing device, substantially as above described.

2. Connecting such separate sections of the well-tube to each other by means of a coupling one end of which slides on one of the sections, substantially as described.

3. The elastic leaves B, arranged, as shown, about the well-tube so as to inclose the slip-joint above described, substantially as above set forth.

4. The elastic covering I, in combination with the spring-leaves B, which it incloses, substantially as above described.

FRANCIS MARTIN.

Witnesses:
M. M. LIVINGSTON,
C. L. TOPLIFF.